(12) United States Patent
Zhang et al.

(10) Patent No.: US 12,377,558 B2
(45) Date of Patent: Aug. 5, 2025

(54) BUFFER ASSEMBLY AND MANIPULATOR (71) Applicant: Beijing Jingdong Qianshi Technology Co., Ltd., Beijing (CN)

(72) Inventors: Jian Zhang, Beijing (CN); Guoku Song, Beijing (CN); Jingren Tang, Beijing (CN)

(73) Assignee: Beijing Jingdong Qianshi Technology Co., Ltd., Beijing (CN)

( * ) Notice: Subject to any disclaimer, the term of this patent is extended or adjusted under 35 U.S.C. 154(b) by 61 days.

(21) Appl. No.: 18/277,457

(22) PCT Filed: Apr. 22, 2022

(86) PCT No.: PCT/CN2022/088371
§ 371 (c)(1),
(2) Date: Aug. 16, 2023

(87) PCT Pub. No.: WO2022/228289
PCT Pub. Date: Nov. 3, 2022

(65) Prior Publication Data
US 2024/0123635 A1    Apr. 18, 2024

(30) Foreign Application Priority Data
Apr. 27, 2021   (CN) .......................... 202110460504.1

(51) Int. Cl.
*B25J 19/00* (2006.01)
*B25J 9/04* (2006.01)
(Continued)

(52) U.S. Cl.
CPC ......... *B25J 19/0091* (2013.01); *B25J 13/089* (2013.01); *B25J 17/0275* (2013.01); *B25J 9/042* (2013.01)

(58) Field of Classification Search
CPC ............... B25J 17/0208; B25J 17/0225; B25J 17/0233; B25J 19/0091
See application file for complete search history.

(56) References Cited

U.S. PATENT DOCUMENTS

| | | | |
|---|---|---|---|
| 2,039,670 A | 5/1936 | Wagner | |
| 3,893,217 A * | 7/1975 | Edmond | ................. B23P 19/12 29/407.08 |

(Continued)

FOREIGN PATENT DOCUMENTS

| | | |
|---|---|---|
| CN | 102689312 A | 9/2012 |
| CN | 106826318 A | 6/2017 |

(Continued)

OTHER PUBLICATIONS

PCT International Search Report and Written Opinion dated Jun. 23, 2022, for International Patent Application No. PCT/CN2022/088371.

(Continued)

*Primary Examiner* — Jake Cook
(74) *Attorney, Agent, or Firm* — K&L Gates LLP (57) ABSTRACT

A buffer assembly includes a first mounting seat, a second mounting seat, a hinge assembly, and an elastic member. One of the first mounting seat or the second mounting seat is configured to be connected to a mechanical arm and the other one is configured to be connected to an end picker. The hinge assembly is connected between the first mounting seat and the second mounting seat and includes a first ball joint mounted in the first mounting seat and a guide rod, one of the second mounting seat or the first ball joint is connected to the guide rod, and the other one is slidably sleeved outside the guide rod. The elastic member is configured to apply a force to enable the second mounting seat to approach the (Continued)

first mounting seat. A manipulator includes a mechanical arm, an end picker, and the buffer assembly described above.

20 Claims, 6 Drawing Sheets

(51) Int. Cl.
    *B25J 13/08*     (2006.01)
    *B25J 17/02*     (2006.01)

(56) References Cited

U.S. PATENT DOCUMENTS

| | | | | |
|---|---|---|---|---|
| 4,179,783 | A * | 12/1979 | Inoyama | B25J 17/0208 901/45 |
| 4,324,032 | A * | 4/1982 | Gustavson | B23P 19/102 901/45 |
| 4,627,169 | A * | 12/1986 | Zafred | B23Q 1/36 33/642 |
| 5,172,922 | A * | 12/1992 | Kowaleski | B25J 15/0616 414/737 |
| 5,271,686 | A * | 12/1993 | Herring, Jr. | B21J 15/10 901/29 |
| 5,549,441 | A | 8/1996 | Reinke | |
| 5,727,915 | A | 3/1998 | Suzuki | |
| 8,794,098 | B2 * | 8/2014 | Long | B25J 9/0057 901/14 |
| 9,709,119 | B2 * | 7/2017 | Kendrick | B25J 17/0208 |
| 10,286,556 | B2 * | 5/2019 | Troy | B25J 17/0208 |
| 11,318,626 | B1 * | 5/2022 | Meincke, II | B25J 17/0208 |
| 11,745,363 | B1 * | 9/2023 | Resciniti | B25J 17/0241 464/160 |
| 2017/0074316 | A1 * | 3/2017 | Kim | A61F 5/0125 |

FOREIGN PATENT DOCUMENTS

| | | | | |
|---|---|---|---|---|
| CN | 107088782 | A | | 8/2017 |
| CN | 108177159 | A | | 6/2018 |
| CN | 110238301 | A | | 9/2019 |
| CN | 111015696 | A | | 4/2020 |
| CN | 210361385 | U | | 4/2020 |
| CN | 212978389 | U | | 4/2021 |
| CN | 113146677 | A | * | 7/2021 |
| CN | 113172664 | A | | 7/2021 |
| DE | 3620391 | A1 | | 12/1987 |
| DE | 102010045315 | A1 | | 3/2012 |
| DE | 102018208247 | A1 | | 11/2019 |
| EP | 2597420 | A1 | | 5/2013 |
| JP | 61182733 | A | * | 2/1985 .......... B25J 17/0208 |
| JP | 61188030 | A | * | 8/1986 .......... B25J 17/0208 |
| JP | 02131891 | A | * | 5/1990 .......... B25J 17/0208 |
| JP | 02131892 | A | * | 5/1990 .......... B25J 17/0208 |
| KR | 20140001186 | U | | 2/2014 |

OTHER PUBLICATIONS

English Translation of Chinese First Office Action dated Apr. 27, 2023 for Chinese Patent Application No. 202110460504.1.
Search Report from related European Patent Application No. 22794760.3 issued Jun. 11, 2024.

* cited by examiner

BUFFER ASSEMBLY AND MANIPULATOR

CROSS-REFERENCE TO RELATED APPLICATIONS

This patent application is a 35 U.S.C. § 371 National Stage filing based on International Application No. PCT/CN2022/088371, filed on Apr. 22, 2022, which application claims priority benefit to Chinese Patent Application No. 202110460504.1, filed with the China National Intellectual Property Administration (CNIPA) on Apr. 27, 2021, the disclosures of which are incorporated herein by reference in their entireties.

TECHNICAL FIELD

The present application relates to the technical field of automation devices, for example, a buffer assembly and a manipulator.

BACKGROUND

With the development of mechanical automation technology, manipulators are widely used in various fields such as machining, production, and logistics to achieve automated transfer and handling of materials, thereby improving the efficiency and accuracy of material transfer.

An end picker is a component of various types of manipulators for picking up the materials to be handled and is connected to the end of a mechanical arm. A control system controls the mechanical arm to move based on a trajectory preset by the system or according to a movement trajectory calculated by an algorithm so that the end picker reaches a target position and picks up the materials.

SUMMARY

In the first aspect, the present application provides a buffer assembly. The buffer assembly includes a first mounting seat, a second mounting seat, a hinge assembly, and an elastic member.

One of the first mounting seat or the second mounting seat is configured to be connected to a mechanical arm and the other one of the first mounting seat or the second mounting seat is configured to be connected to an end picker.

The hinge assembly is connected between the first mounting seat and the second mounting seat, where the hinge assembly includes a first ball joint and a guide rod, the first ball joint is mounted in the first mounting seat, one of the second mounting seat or the first ball joint is connected to the guide rod, and the other one of the second mounting seat or the first ball joint is slidably sleeved outside the guide rod.

The elastic member is configured to apply a force to enable the second mounting seat to approach the first mounting seat.

As an optional technical scheme of the buffer assembly, a second ball joint is mounted on the second mounting seat, and the second mounting seat is connected to the guide rod through the second ball joint.

As an optional technical scheme of the buffer assembly, the first ball joint is fixed to a first end of the guide rod, and the second ball joint is slidably sleeved on the guide rod.

As an optional technical scheme of the buffer assembly, the first ball joint is sleeved outside the guide rod, a limiting portion protrudes from an outer wall of the first end of the guide rod, and the limiting portion abuts against a side of the first ball joint facing away from the second ball joint.

As an optional technical scheme of the buffer assembly, in the case where the buffer assembly is in an initial state, the first mounting seat faces and abuts against the second mounting seat, and/or the first ball joint faces and abuts against the second ball joint.

As an optional technical scheme of the buffer assembly, the elastic member is sleeved on the guide rod, the elastic member is located on a side of the second ball joint facing away from the first ball joint, an end of the elastic member is fixed relative to the guide rod, the other end of the elastic member abuts against the second ball joint, and the elastic member is always in a compressed state.

As an optional technical scheme of the buffer assembly, in the case where the buffer assembly is in an initial state, a surface of the second mounting seat abuts against a surface of the first mounting seat.

As an optional technical scheme of the buffer assembly, the second mounting seat includes a mounting plate and a mounting sleeve, where the mounting sleeve is detachably connected to a side of the mounting plate facing away from the first mounting seat, the second ball joint is detachably mounted to the mounting plate, and a second end of the guide rod inserted through the mounting sleeve.

As an optional technical scheme of the buffer assembly, an air inlet channel is opened on the first mounting seat, the guide rod has an axially penetrating cavity, an air outlet channel is opened on the second mounting seat, and two ends of the cavity separately communicate with the air inlet channel and the air outlet channel.

As an optional technical scheme of the buffer assembly, the buffer assembly further includes a detection unit, where the detection unit is configured to detect a relative position between the first mounting seat and the second mounting seat.

As an optional technical scheme of the buffer assembly, multiple detection units are spaced from each other around the first ball joint.

As an optional technical scheme of the buffer assembly, the multiple detection units are disposed on a side of the first mounting seat facing the second mounting seat, and/or the multiple detection units are disposed on a side of the second mounting seat facing the first mounting seat.

A detection unit of the multiple detection units includes an inching switch, a pressure sensor, a micro switch, or a proximity sensor.

As an optional technical scheme of the buffer assembly, a positioning hole is disposed on one of the first mounting seat or the second mounting seat, a positioning column protrudes from the other one of the first mounting seat or the second mounting seat, and the positioning column is capable of being inserted into the positioning hole.

In a second aspect, the present application further provides a manipulator. The manipulator includes a mechanical arm, an end picker, and the buffer assembly described above. One of the first mounting seat or the second mounting seat is connected to an end of the mechanical arm, and the other one of the first mounting seat or the second mounting seat is connected to the end picker.

REFERENCE LIST 100 buffer assembly
200 end picker
201 connection pipe
202 absorption member
300 mechanical arm
1 first mounting seat
11 mounting groove
12 air inlet channel
13 positioning hole
2 second mounting seat
21 mounting plate
211 bypass groove
22 mounting sleeve
221 main sleeve portion
2211 accommodation cavity
222 end plate portion
223 connection sleeve portion
2231 vent hole
3 hinge assembly
31 first ball joint
311 first ball joint seat
312 first ball head
3121 first plane
32 second ball joint
321 second ball joint seat
322 second ball head
3221 second plane
33 guide rod
331 cavity
332 limiting portion
4 elastic member
5 sealing plate
6 retaining member
61 retaining ring portion
62 connecting portion
63 air hole
7 positioning column
8 detection unit

DETAILED DESCRIPTION

The present application is described in detail below in conjunction with the drawings and embodiments.

In the description of the present application, unless otherwise expressly specified and limited, terms "connected to each other", "connected", and "secured" are to be construed in a broad sense, for example, as securely connected, detachably connected, or integrated; mechanically connected or electrically connected; directly connected to each other or indirectly connected to each other via an intermediary; or internally connected between two components or an interaction relation between two components. For those of ordinary skill in the art, specific meanings of the preceding terms in the present application may be understood based on specific situations.

In the present application, unless otherwise expressly specified and limited, when a first feature is described as "above" or "below" a second feature, the first feature and the second feature may be in direct contact or be in contact via another feature between the two features instead of being in direct contact. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

In the description of the present application, orientations or position relations indicated by terms such as "above", "below", "right", and the like are orientations or position relations based on the drawings. These orientations or position relations are intended only to facilitate the description and simplify operations and not to indicate or imply that a device or element referred to must have such specific orientations or must be configured or operated in such specific orientations. Thus, these orientations or position relations are not to be construed as limiting the present application. In addition, terms "first" and "second" are used only to distinguish between descriptions and have no special meaning.

The manipulator in the related art usually lacks an obstacle avoidance function. In the operation process of the manipulator, if the end picker interferes with other items and stops moving, the manipulator continues to move since the manipulator cannot sense the existence of obstacles, causing the end picker to collide with the obstacles, resulting in damage to the obstacles and/or damage or destruction of the end picker, or even resulting in the malfunction and damage of the manipulator, and affecting the usage safety and reliability of the manipulator.

As shown in FIGS. 1 to 4, this embodiment provides a manipulator that can be applied in the fields of production, machining, and logistics. The manipulator is configured to pick up materials for the transfer and handling of the materials. The present application does not limit the application scenario of the manipulator and the type of materials to be handled by the manipulator.

The manipulator includes a mechanical arm 300, an end picker 200, and a control system. The end picker 200 is connected to the end of the mechanical arm 300, and the mechanical arm 300 can drive at least the end picker 200 to be translated along a first direction to move the end picker 200 to a target position. The end picker 200 is provided along a second direction, and the end picker 200 is configured to pick up the materials located at the target position. The control system is configured to control the movement of the mechanical arm 300 and thus control a movement trajectory of the end picker 200.

When the mechanical arm 300 drives the end picker 200 to move along the first direction, if the end picker 200 is stopped by an external obstacle, since the mechanical arm 300 cannot sense the obstacle and immediately stop moving, the end picker 200 and the mechanical arm 300 tend to move relative to each other. To avoid damage to the end picker 200 and/or the mechanical arm 300 caused by the movement tendency, in this embodiment, a buffer assembly 100 is connected between the end picker 200 and the mechanical arm 300 to improve the anti-collision capability of the mechanical arm 300 and the end picker 200 and provide anti-collision protection to an external device.

Optionally, the buffer assembly 100 includes a first mounting seat 1, a second mounting seat 2, a hinge assembly 3, and an elastic member 4. The hinge assembly 3 includes a guide rod 33 and a first ball joint 31. The first ball joint 31 is mounted to the first mounting seat 1, one of the first ball joint 31 or the second mounting seat 2 is connected to the guide rod 33, and the other one of the second mounting seat 2 or the first ball joint 31 is slidably sleeved on the guide rod 33 so that the buffer assembly 100 can switch between an initial state in which the second mounting seat 2 faces the first mounting seat 1 and an offset state in which the second mounting seat 2 is deflected or moved relative to the first mounting seat 1. The elastic member 4 is configured to apply a force to enable the second mounting seat 2 to approach the first mounting seat 1.

One of the second mounting seat 2 or the first mounting seat 1 is connected to the end of the mechanical arm 300, and the other one of the second mounting seat 2 or the first mounting seat 1 is connected to the end picker 200. That is, when the end picker 200 stops moving due to the external obstacle and the mechanical arm 300 continues moving along a set direction, since one of the second mounting seat 2 or the first ball joint 31 is slidably sleeved on the guide rod 33 and the other one of the second mounting seat 2 or the first ball joint 31 is fixedly connected to the guide rod 33, the distance between the second mounting seat 2 and the first ball joint 31 in a length direction of the guide rod 33 is changed, thereby providing space for the relative motion between the end picker 200 and the mechanical arm 300. Moreover, since the first ball joint 31 is hinged to the first mounting seat 1 and the first mounting seat 1 can be deflected relative to the second mounting seat 2, the mechanical arm 300 can be deflected relative to the end picker 200, thereby avoiding direct collision between the mechanical arm 300 and the end picker 200 and providing protection to the end picker 200 and the mechanical arm 300. At the same time, since the first ball joint 31 can freely rotate relative to the first mounting seat 1, that is, the first mounting seat 1 and the second mounting seat 2 can be deflected in any direction so that the end picker 200 is applicable to multi-angle collision in different directions and thus has high applicability. The elastic member is provided so that the buffer assembly 100 can be automatically reset after the external force is withdrawn, thereby improving the usage reliability and automation of the buffer assembly 100 and the manipulator.

In the buffer assembly provided by embodiments of the present application, when the end picker connected to the first mounting seat or the second mounting seat is subjected to an external force or collides with an external obstacle, the first mounting seat and the second mounting seat can move or be deflected relative to each other, thereby avoiding direct collision or a relatively large interaction force between the mechanical arm and the end picker and providing the anti-collision protection to the mechanical arm and the end picker. At the same time, since the first ball joint is provided, the guide rod can rotate in multiple directions relative to the first mounting seat, that is, the mechanical arm and the end picker can be deflected in multiple directions, thereby achieving multi-angle anti-collision and buffer protection and improving applicability. The elastic member is provided so that the buffer assembly can be automatically reset after the external force is withdrawn, thereby improving the usage reliability and automation of the buffer assembly and the manipulator.

In the manipulator provided by the embodiments of the present application, the mechanical arm and the end picker are connected by using the buffer assembly so that the multi-angle anti-collision protection of the manipulator can be improved and the usage safety and reliability of the manipulator can be improved.

To improve the usage safety of the manipulator, the buffer assembly 100 further includes a detection unit 8, where the detection unit 8 is configured to detect the relative positions between the second mounting seat 2 and the first mounting seat 1, acquire an offset degree of the first mounting seat 1 relative to the second mounting seat 2, and acquire an offset degree of the end picker 200 relative to the mechanical arm 300. That is, the detection unit 8 knows whether the end picker 200 in operation encounters an obstacle so that detection information can be sent to the control system of the manipulator, and the control system can control the mechanical arm 300 to stop moving in time according to the detection information, thereby ensuring the operational safety and reliability of the manipulator.

In this embodiment, the first mounting seat 1 is connected to the end of the mechanical arm 300, and the end picker 200 is connected to a side of the second mounting seat 2 facing away from the first mounting seat 1. In other embodiments, the first mounting seat 1 is connected to the end picker 200 and the mechanical arm 300 is connected to the second mounting seat 2.

Optionally, the end of the mechanical arm 300 and the end picker 200 are separately located on two opposite sides of the buffer assembly 100 along the second direction, so as to reduce structural interference.

Optionally, the first mounting seat 1 and the mechanical arm 300 are detachably connected to facilitate the disassembly and assembly of the buffer assembly 100. The connection manner may be, but is not limited to, a threaded connection, the connection structure may be, but is not limited to, a flange connection, and the connection structure and connection manner may be set according to the structure of the end of the mechanical arm 300.

In this embodiment, optionally, the first ball joint 31 is fixedly connected to a first end of the guide rod 33, and the second mounting seat 2 is slidably sleeved on the guide rod 33. Therefore, when the end picker 200 stops moving due to the external obstacle, since the first mounting seat 1 continues moving along the first direction, the first ball joint 31 can drive the guide rod 33 to rotate relative to the first mounting seat 1; and since the second mounting seat 2 is slidably sleeved on the guide rod 33, the guide rod 33 can drive the second mounting seat 2 to rotate relative to the first mounting seat 1 and at the same time, the second mounting seat 2 slides along the guide rod 33 along a direction away from the first mounting seat 1, that is, the second mounting seat 2 is deflected relative to the first mounting seat 1. In this manner, the interference with the structure of the mechanical arm 300 caused by the sliding between the first mounting seat 1 and the guide rod 33 can be avoided, the structure of the first mounting seat 1 is simplified, and the connection structure between the first mounting seat 1 and the mechanical arm 300 is simplified.

In other embodiments, the guide rod 33 is fixedly connected to the second mounting seat 2 and the first ball joint 31 is slidably sleeved on the guide rod 33. In other embodiments, the guide rod 33 is hinged to the second mounting seat 2 and the first ball joint 31 is slidably sleeved on the guide rod 33.

Optionally, the hinge assembly 3 further includes a second ball joint 32, where the second ball joint 32 is mounted to the second mounting seat 2 and the second ball joint 32 is slidably sleeved on the guide rod 33. A mounting cavity is disposed in the second mounting seat 2, and an end of the guide rod 33 facing away from the first ball joint 31 is rotatably accommodated in the mounting cavity. The second ball joint 32 is provided so that the guide rod 33 can rotate relative to the second mounting seat 2, thereby improving the moving flexibility of the second mounting seat 2 and in the case where other structures keep unchanged, increasing the maximum angle at which the second mounting seat 2 can be deflected relative to the first mounting seat 1, improving the impact absorption effect, improving the buffer effect and crashworthiness, and improving the compactness and the usage safety and reliability of the buffer assembly 100.

In other embodiments, the second mounting seat 2 can only slide relative to the guide rod 33, that is, the angle at which the second mounting seat 2 is deflected relative to the first mounting seat 1 is the same as the angle at which the guide rod 33 is deflected relative to the first mounting seat 1. In this case, a sliding bushing may be disposed between the second mounting seat 2 and the guide rod 33 to reduce frictional resistance.

Optionally, when the buffer assembly 100 is in the initial state, a surface of the second mounting seat 2 faces and abuts against a surface of the first mounting seat 1, thereby improving the compactness and positional stability of the buffer assembly 100. In other embodiments, when the buffer assembly 100 is in the initial state, a certain clearance may exist between the second mounting seat 2 and the first mounting seat 1, as long as a stable position relationship between the second mounting seat 2 and the first mounting seat 1 is ensured during the normal operation.

Optionally, cross sections of the second mounting seat 2 and the first mounting seat 1 may be circular, so as to reduce corners and knocks and facilitate connection. Abutting end surfaces of the second mounting seat 2 and the first mounting seat 1 are set coaxially and have the same diameters, so as to improve the compactness and aesthetics of the structure in the initial state. However, it is to be understood that the cross-sectional shapes of the second mounting seat 2 and the first mounting seat 1 may be set according to the connection requirements.

In this embodiment, the elastic member 4 is optionally a spring, and optionally, the spring is sleeved on the guide rod 33 to facilitate the installation of the spring and the application of an elastic restoring force. Optionally, the elastic member 4 is sleeved on a side of the second ball joint 32 facing away from the first ball joint 31, an end of the elastic member 4 is fixed relative to the guide rod 33, and the other end of the elastic member 4 abuts against the second ball joint 32. In the initial state, the first ball joint 31 abuts against the second ball joint 32, and the elastic member 4 is in a compressed state. In this manner, in the case where the buffer assembly 100 is in the initial state, the elastic member 4 always applies an elastic force to the second ball joint 32 so that the second ball joint 32 abuts against the first ball joint 31, and thus the second mounting seat 2 closely fits the first mounting seat 1 and the positional stability and usage reliability of the end picker 200 in a normal state are ensured.

In other embodiments, the elastic member 4 may be disposed at other positions. For example, an end of the elastic member 4 is fixed to an outer sidewall of the second mounting seat 2, and the other end of the elastic member 4 is fixed to an outer sidewall of the first mounting seat 1. Moreover, in the initial state, the elastic member 4 is in an elongated state, that is, the elastic member 4 pulls the second mounting seat 2 so that the second mounting seat 2 closely fits the first mounting seat 1. Alternatively, the elastic member 4 is accommodated inside the second mounting seat 2 or the first mounting seat 1, and two ends of the elastic member 4 are separately connected to the first mounting seat 1 and the second mounting seat 2.

To facilitate the installation of the first ball joint 31, a mounting groove 11 is opened on a side of the first mounting seat 1 facing the second mounting seat 2, and the first ball joint 31 is mounted in the mounting groove 11. The first ball joint 31 includes a first ball joint seat 311 and a first ball head 312, where the first ball joint seat 311 is detachably mounted in the mounting groove 11, and the first ball head 312 is movably disposed on the first ball joint seat 311. Optionally, the mounting groove 11 includes a first groove portion and a second groove portion, where the first groove portion is located on a side of the second groove portion facing the second mounting seat 2, and the diameter of the first groove portion is greater than the diameter of the second groove portion so that a limiting step is formed between the second groove portion and the first groove portion. The first ball joint seat 311 is mounted in the first groove portion and abuts against the limiting step, and the first ball head 312 partially extends into the second groove portion.

To facilitate the disassembly and assembly of the first ball joint 31 and prevent the first ball joint 31 from coming out of the mounting groove 11, a sealing plate 5 is disposed at a groove opening of the first groove portion of the first mounting seat 1, the sealing plate 5 is provided with an opening with a diameter less than the diameter of the first groove portion, and the first ball head 312 can partially extend through the opening. The sealing plate 5 is detachably connected to the first mounting seat 1, and the sealing plate 5 abuts against an end of the first ball joint seat 311 facing away from the limiting step.

For a mating structure of the first ball joint seat 311 and the first ball head 312 in the first ball joint 31, reference may be made to the structure of the ball joint in the related art and details are not repeated here. It is also to be understood that the mounting structure of the first ball joint 31 and the first mounting seat 1 is only an exemplary structure, and in other embodiments, the mounting structure of the first ball joint 31 and the first mounting seat 1 may be set with reference to the mounting structure of the ball joint in the related art.

To prevent the sealing plate 5 from protruding from an end surface of the first mounting seat 1 and affecting the abutment between the first mounting seat 1 and the second mounting seat 2, optionally, a bypass groove 211 is opened on an end surface of the second mounting seat 2 facing the first mounting seat 1, and when the buffer assembly 100 is in the initial state, the sealing plate 5 is accommodated in the bypass groove 211. Optionally, the groove depth of the bypass groove 211 is greater than the thickness of the sealing plate 5.

The second ball joint 32 includes a second ball joint seat 321 and a second ball head 322, where the second ball joint seat 321 is detachably mounted in an accommodation cavity 2211, and the second ball head 322 is movably disposed in the second ball joint seat 321 and can protrude at two opposite ends of the second ball joint seat 321. The structure of the second ball joint 32 may be set with reference to the first ball joint 31 or the ball joint structure in the related art.

To facilitate the connection between the first ball joint 31 and the guide rod 33, optionally, a first mounting hole is opened on the first ball joint 31, and the first end of the guide rod 33 fixedly inserted through the first mounting hole. A limiting portion 332 protrudes from an outer wall of the first end of the guide rod 33, and the limiting portion 332 abuts against a side of the first ball head 312 facing away from the second ball joint 32 to achieve the installation limit of the first ball joint 31 and the guide rod 33 to prevent the first ball joint 31 from being detached from the guide rod 33. In this manner, the convenience of connecting the guide rod 33 to the first ball joint 31 can be improved. In other embodiments, the guide rod 33 may be directly connected to an outer wall of the first ball head 312, and the connection manner may be integrally formed, welded, or threaded.

Optionally, first planes 3121 are provided on two opposite sides of the first ball joint 31, second planes 3221 are provided on two opposite sides of the second ball joint 32, and the first planes 3121 and the second planes 3221 are perpendicular to the length direction of the guide rod 33. The first planes 3121 are provided to facilitate the abutment of the first ball joint 31 with the limiting portion 332 and the second ball joint 32. The second planes 3221 are provided to facilitate the abutment of the second ball joint 32 with the first ball joint 31 and the elastic member 4.

To facilitate the installation of the elastic member 4, a retaining member 6 is disposed at a second end of the guide rod 33, the retaining member 6 protrudes from an outer wall of the guide rod 33, and an end of the elastic member 4 facing away from the second ball joint 32 abuts against the retaining member 6. Optionally, the retaining member 6 is detachably connected to the guide rod 33, so as to simplify the structure of the guide rod 33 and reduce the machining requirement of the guide rod 33. In other embodiments, the retaining member 6 may be a structure protruding from the outer wall of the guide rod 33 and integrally formed with the guide rod 33.

The retaining member 6 includes a retaining ring portion 61 and a connecting portion 62, where the retaining ring portion 61 is connected to an end of the connecting portion 62, the connecting portion 62 is inserted into the inside of the guide rod 33 and detachably connected to the guide rod 33, the retaining ring portion 61 is located on an outer side of the guide rod 33 and protrudes from an outer sidewall of the guide rod 33, and the elastic member 4 abuts against the retaining ring portion 61.

The second mounting seat 2 includes a mounting plate 21 and a mounting sleeve 22 that are detachably connected, where the mounting sleeve 22 is connected to a side of the mounting plate 21 facing away from the first mounting seat 1, and a surface of the mounting plate 21 can abut against a surface of the first mounting seat 1. A through hole penetrates through and is opened on the mounting plate 21, the mounting sleeve 22 has the accommodation cavity 2211, the through hole directly faces and communicates with the accommodation cavity 2211, and the through hole and the accommodation cavity 2211 together form the mounting cavity. The second ball joint 32 is detachably mounted in the through hole, and the second end of the guide rod 33 and the elastic member 4 are located in the accommodation cavity 2211.

The mounting plate 21 and the mounting sleeve 22 that are detachably connected are provided to facilitate the assembly of the elastic member 4, the guide rod 33, and the second ball joint 32. In this manner, when the buffer assembly 100 is assembled, the first ball joint 31 may be mounted to the first mounting seat 1 first, the guide rod 33 is connected to the first ball joint 31, the mounting plate 21 mounted with the second ball joint 32 is sleeved on the guide rod 33, then the elastic member 4 and the retaining member 6 are mounted, and finally, the mounting sleeve 22 is mounted, thereby effectively improving the installation convenience and efficiency and improving the installation accuracy.

The mounting sleeve 22 includes a main sleeve portion 221, where an end plate portion 222 radially protrudes from an end of the main sleeve portion 221 facing the mounting plate 21, and the end plate portion 222 is connected to the mounting plate 21 by a threaded connector, thereby improving the connection convenience and reliability.

To ensure the positioning of the connection between the second mounting seat 2 and the first mounting seat 1 in the case where the buffer assembly 100 is in the initial state, a positioning structure is disposed between the second mounting seat 2 and the first mounting seat 1. The positioning structure includes a positioning column 7 disposed on the second mounting seat 2 and a positioning hole 13 opened on the first mounting seat 1. The positioning column 7 can be inserted into the positioning hole 13, and a clearance exists between the positioning column 7 and a hole wall of the positioning hole 13 to ensure that the positioning column 7 can exit the positioning hole 13 when the positioning column 7 is deflected with the second mounting seat 2. In other embodiments, the positioning column may be disposed on the first mounting seat 1 and the positioning hole may be disposed on the second mounting seat 2. Optionally, multiple positioning structures may be spaced apart from each other along a circumferential direction of the first mounting seat 1, thereby ensuring a positioning effect.

In this embodiment, the positioning column 7 is detachably connected to the second mounting seat 2. Optionally, a plughole is opened on and penetrates through the second mounting seat 2, and the positioning column 7 is inserted into the plughole. A limiting ring radially protrudes from an outer wall of the positioning column 7, an adaptable limiting ring groove is opened on a hole wall of the plughole, the limiting ring groove penetrates through the end surface of the second mounting seat 2 facing the first mounting seat 1, and the limiting ring is located in the limiting ring groove. In other embodiments, the positioning column 7 may be integrally formed with the second mounting seat 2.

Optionally, multiple detection units 8 are spaced apart from each other around the first ball joint 31, thereby ensuring that when the first mounting seat 1 and the second mounting seat 2 are deflected in any direction, a deflection degree of the second mounting seat 2 relative to the first mounting seat 1 can be effectively detected.

To improve the detection accuracy, the detection units 8 are disposed on the side of the first mounting seat 1 facing the second mounting seat 2, and/or the detection units 8 are disposed on a side of the second mounting seat 2 facing the first mounting seat 1 so that the distance between relative end surfaces of the first mounting seat 1 and the second mounting seat 2 may be directly detected, thereby detecting the deflection degree.

Optionally, the detection unit 8 may be an inching switch, a pressure sensor, a micro switch, a proximity sensor, or the like, and the detection unit 8 may be a mature product in the related art. When the first mounting seat 1 closely fits the second mounting seat 2, the detection units 8 are in a triggered state, and the control system determines that the manipulator is in normal operation. When the first mounting seat 1 and the second mounting seat 2 are partially out of contact at a position corresponding to any detection unit 8, the corresponding detection unit 8 is in a disconnected state, that is, the control system may determine that the end picker 200 collides with the external obstacle.

In this embodiment, the guide rod 33 is a hollow rod-like structure having an axially penetrating cavity 331. An air inlet channel 12 is opened on the first mounting seat 1, an air outlet channel is disposed in the second mounting seat 2, and two ends of the cavity 331 separately communicate with the air inlet channel 12 and the air outlet channel. In this manner, air can be supplied to the adsorption end picker 200 or the pneumatic claw end picker 200, thereby improving the compactness and the usage and installation convenience of the end picker 200.

Optionally, the air inlet channel 12 extends along a radial direction of the first mounting seat 1, an end of the air inlet channel 12 penetrates through the outer sidewall of the first mounting seat 1, the other end of the air inlet channel 12 communicates with the second groove portion of the mounting groove 11, and the cavity 331 communicates with the second groove portion. A vent hole 2231 and is opened at an end of the mounting sleeve 22 facing away from the mounting plate 21 and penetrates through the mounting sleeve 22, the vent hole 2231 and the accommodation cavity 2211 together form the air outlet channel, an air hole 63 communicating with the cavity 331 is opened on and penetrates through the retaining member 6, and the cavity 331 communicates with the accommodation cavity 2211 through the air hole 63.

Figure 1:
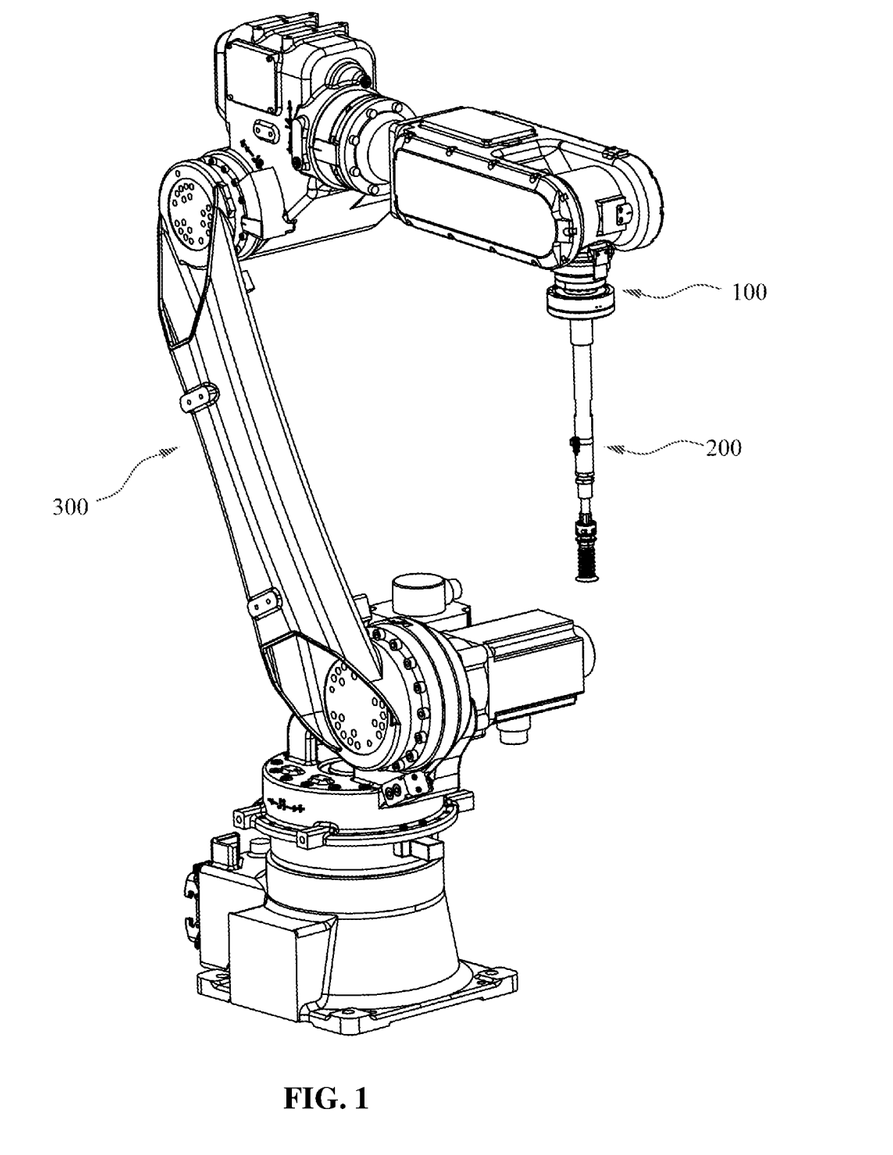
FIG. 1 is a structural view of a manipulator according to an embodiment of the present application with a buffer assembly in an initial state.
Figure 2:
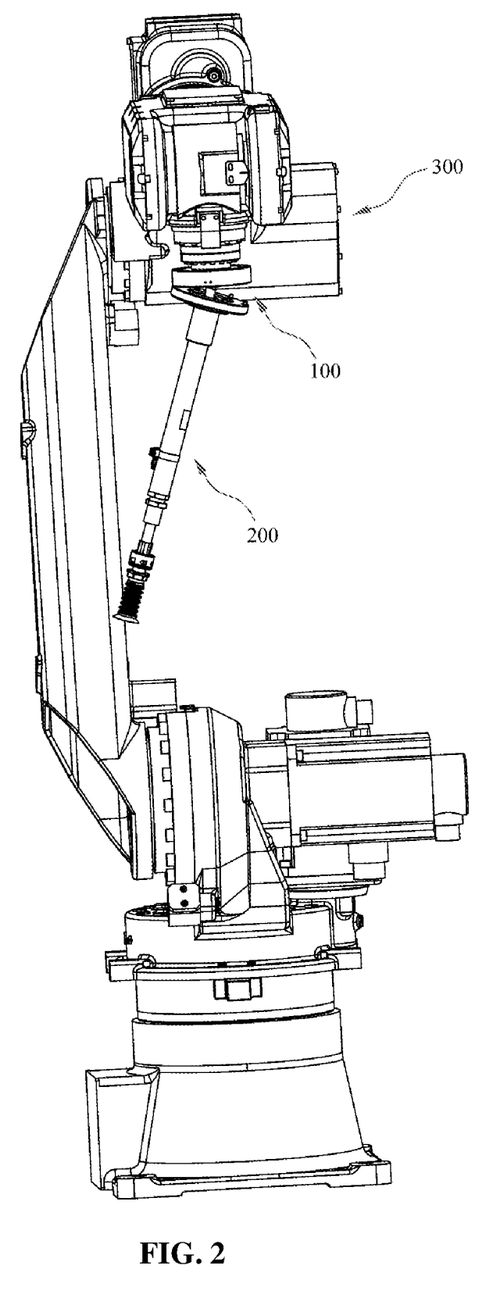
FIG. 2 is a structural view of a manipulator according to an embodiment of the present application with a buffer assembly in an offset state.
Figure 3:
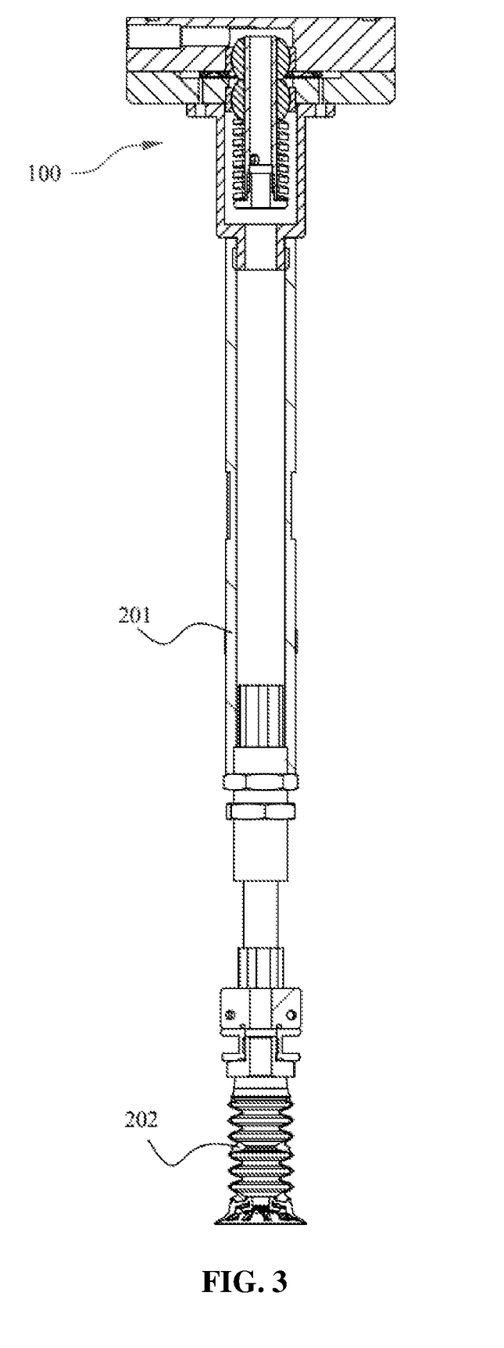
FIG. 3 is a sectional view of a buffer assembly in an initial state and an end picker according to an embodiment of the present application.
Figure 4:
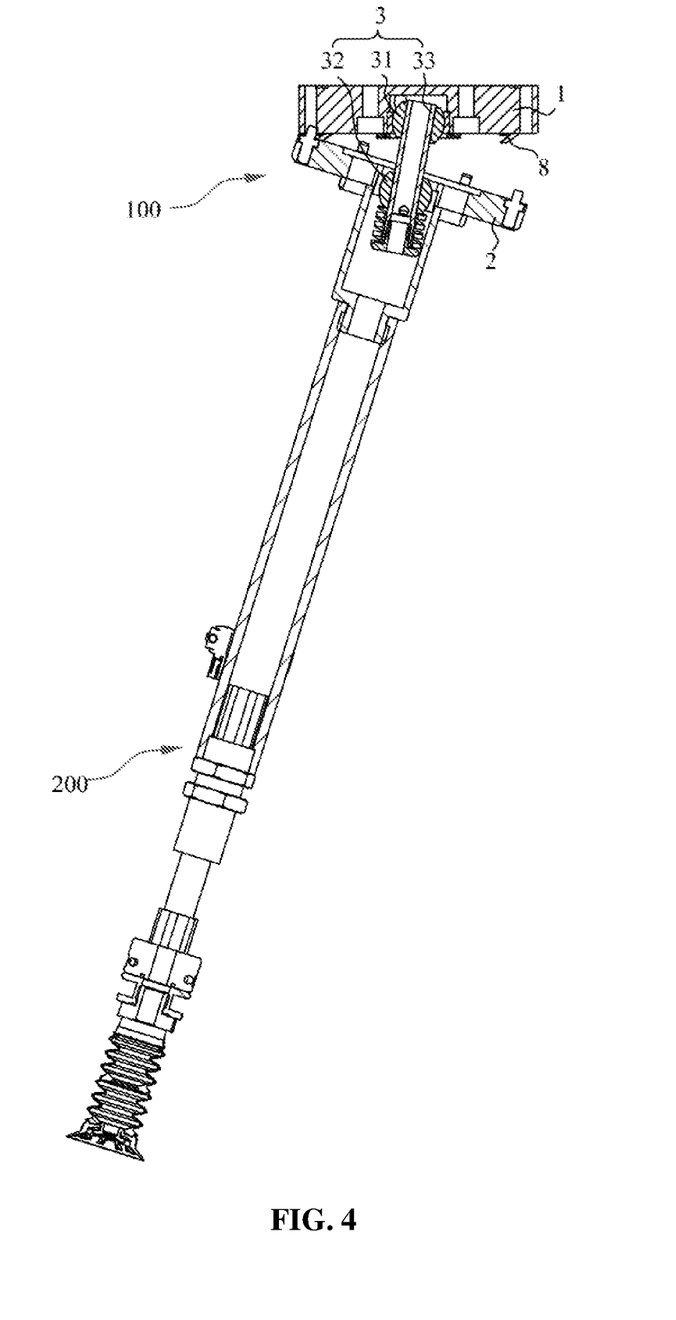
FIG. 4 is a sectional view of a buffer assembly in an offset state and an end picker according to an embodiment of the present application.
Figure 5:
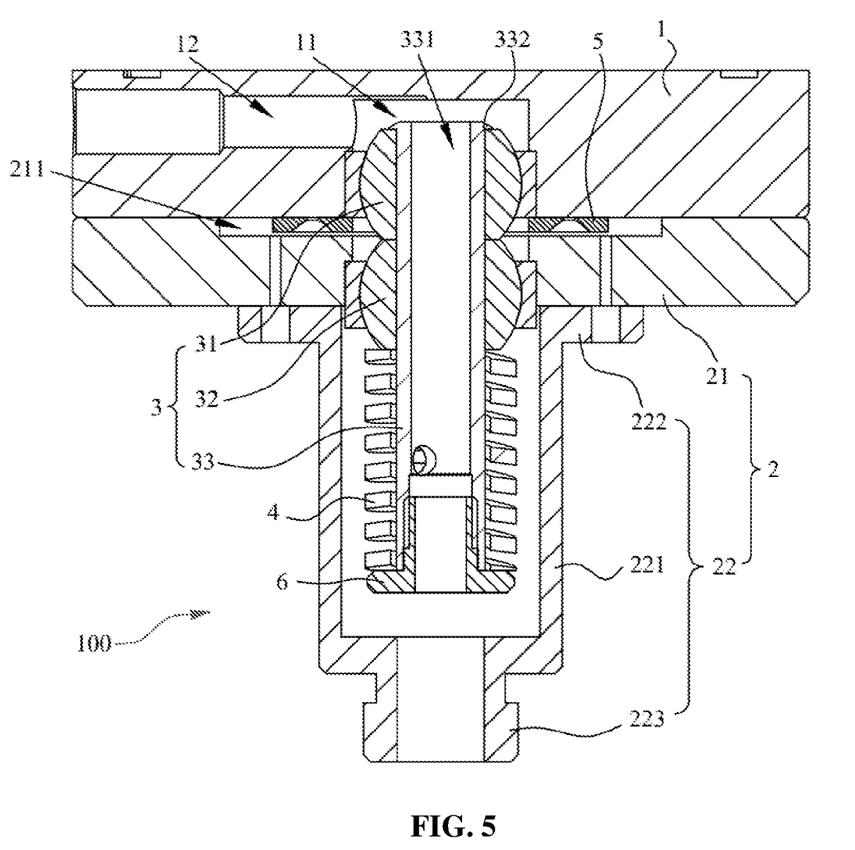
FIG. 5 is a sectional view of a buffer assembly in an initial state according to an embodiment of the present application.
Figure 6:
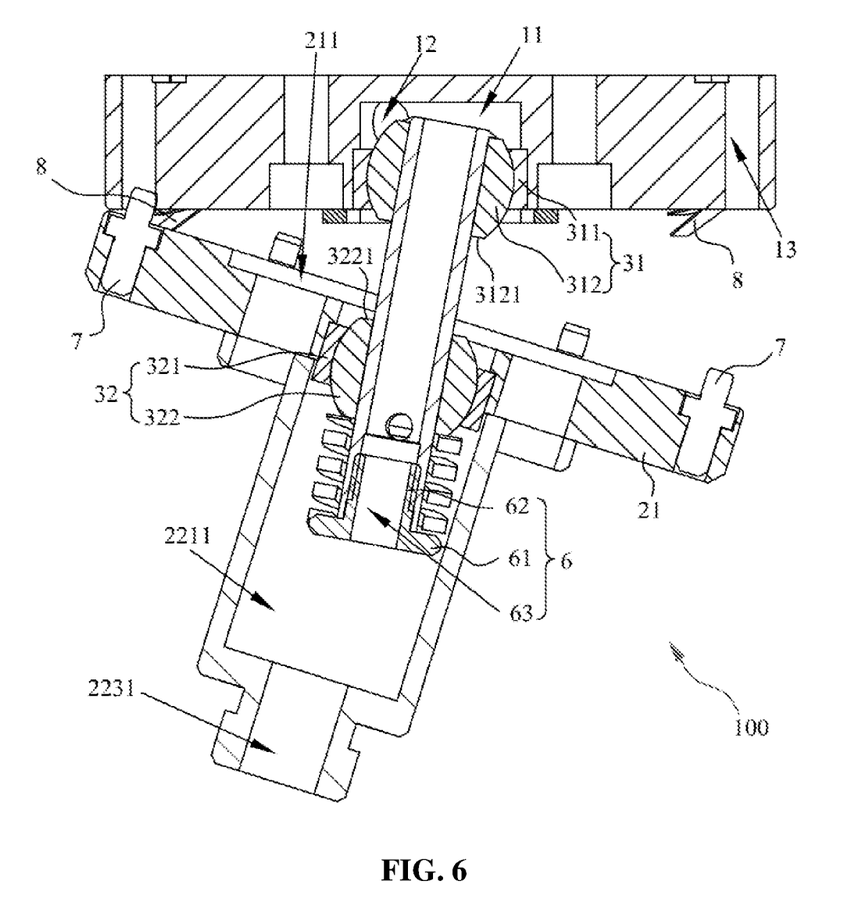
FIG. 6 is a sectional view of a buffer assembly in an offset state according to an embodiment of the present application.

As shown in FIGS. 3, 5, and 6, in this embodiment, the end picker 200 includes a connection pipe 201 and an adsorption member 202. An end of the connection pipe 201 is detachably connected to the end of the mounting sleeve 22 facing away from the mounting plate 21, the other end of the connection pipe 201 is connected to the adsorption member 202, the adsorption member 202 has an adsorption air channel for vacuum adsorption, and the connection pipe 201 communicates with the air outlet channel and the adsorption air channel That is, the air inlet channel 12, the cavity 331, the air outlet channel, an inner cavity of the connection pipe 201, and the adsorption air channel together form a vacuum air channel for vacuum adsorption.

To facilitate the connection between the connection pipe 201 and the mounting sleeve 22, a connection sleeve portion 223 is connected to an end of the main sleeve portion 221 facing away from the mounting plate 21, the outer diameter of the connection sleeve portion 223 is less than the outer diameter of the main sleeve portion 221, an external thread is provided on an outer wall of the connection sleeve portion 223, an internal thread is provided inside the connection pipe 201, and the connection sleeve portion 223 and the connection pipe 201 are screwed together through the threads. In other embodiments, the connection pipe 201 and the mounting sleeve 22 may be connected by a flange connection or other connection structures in the related art, which is not limited in the present application.

In this embodiment, the adsorption member 202 may be, but is not limited to, a suction nozzle and a suction cup. The structure of the end picker 200 may be set with reference to the adsorption end picker 200 in the related art. Moreover, it is to be understood that in other embodiments, the end picker 200 may be other structures that can be used for picking up the materials, such as a pneumatic gripper.

What is claimed is:

1. A buffer assembly, comprising:
    a first mounting seat;
    a second mounting seat, wherein one of the first mounting seat or the second mounting seat is configured to be connected to a mechanical arm and another one of the first mounting seat or the second mounting seat is configured to be connected to an end picker;
    a hinge assembly connected between the first mounting seat and the second mounting seat, wherein the hinge assembly comprises a first ball joint and a guide rod, the first ball joint is mounted in the first mounting seat, one of the second mounting seat or the first ball joint is connected to the guide rod, and another one of the second mounting seat or the first ball joint is slidably sleeved outside the guide rod; and
    an elastic member configured to apply a force to enable the second mounting seat to approach the first mounting seat.

2. The buffer assembly of claim 1, wherein a second ball joint is mounted on the second mounting seat, and the second mounting seat is connected to the guide rod through the second ball joint.

3. The buffer assembly of claim 2, wherein the first ball joint is fixed to a first end of the guide rod, and the second ball joint is slidably sleeved on the guide rod.

4. The buffer assembly of claim 3, wherein the first ball joint is sleeved outside the guide rod, a limiting portion protrudes from an outer wall of the first end of the guide rod, and the limiting portion abuts against a side of the first ball joint facing away from the second ball joint.

5. The buffer assembly of claim 3, wherein in a case where the buffer assembly is in an initial state, at least one of the following is satisfied: the first mounting seat faces and abuts against the second mounting seat; or the first ball joint faces and abuts against the second ball joint.

6. The buffer assembly of claim 3, wherein the elastic member is sleeved on the guide rod, the elastic member is located on a side of the second ball joint facing away from the first ball joint, an end of the elastic member is fixed relative to the guide rod, another end of the elastic member abuts against the second ball joint, and the elastic member is always in a compressed state.

7. The buffer assembly of claim 6, wherein in a case where the buffer assembly is in an initial state, a surface of the second mounting seat abuts against a surface of the first mounting seat.

8. The buffer assembly of claim 2, wherein the second mounting seat comprises a mounting plate and a mounting sleeve, wherein the mounting sleeve is detachably connected to a side of the mounting plate facing away from the first mounting seat, the second ball joint is detachably mounted to the mounting plate, and a second end of the guide rod inserted through the mounting sleeve.

9. The buffer assembly of claim 1, wherein an air inlet channel is opened on the first mounting seat, the guide rod has an axially penetrating cavity, an air outlet channel is opened on the second mounting seat, and two ends of the cavity separately communicate with the air inlet channel and the air outlet channel.

10. The buffer assembly of claim 1, further comprising:
    a detection unit, wherein the detection unit is configured to detect a relative position between the first mounting seat and the second mounting seat.

11. The buffer assembly of claim 10, wherein a plurality of detection units are spaced from each other around the first ball joint.

12. The buffer assembly of claim 11, wherein the plurality of detection units satisfy at least one of the following: the plurality of detection units are disposed on a side of the first mounting seat facing the second mounting seat; or the plurality of detection units are disposed on a side of the second mounting seat facing the first mounting seat; and
a detection unit of the plurality of detection units comprises an inching switch, a pressure sensor, a micro switch, or a proximity sensor.

13. The buffer assembly of claim 1, wherein a positioning hole is disposed on one of the first mounting seat or the second mounting seat, a positioning column protrudes from another one of the first mounting seat or the second mounting seat, and the positioning column is capable of being inserted into the positioning hole.

14. A manipulator comprising a mechanical arm, an end picker, and a buffer assembly wherein the buffer assembly comprises:
a first mounting seat;
a second mounting seat, wherein one of the first mounting seat or the second mounting seat is configured to be connected to the mechanical arm and another one of the first mounting seat or the second mounting seat is configured to be connected to the end picker;
a hinge assembly connected between the first mounting seat and the second mounting seat, wherein the hinge assembly comprises a first ball joint and a guide rod, the first ball joint is mounted in the first mounting seat, one of the second mounting seat or the first ball joint is connected to the guide rod, and another one of the second mounting seat or the first ball joint is slidably sleeved outside the guide rod; and
an elastic member configured to apply a force to enable the second mounting seat to approach the first mounting seat.

15. The manipulator of claim 14, wherein a second ball joint is mounted on the second mounting seat, and the second mounting seat is connected to the guide rod through the second ball joint.

16. The manipulator of claim 15, wherein the first ball joint is fixed to a first end of the guide rod, and the second ball joint is slidably sleeved on the guide rod.

17. The manipulator of claim 16, wherein the first ball joint is sleeved outside the guide rod, a limiting portion protrudes from an outer wall of the first end of the guide rod, and the limiting portion abuts against a side of the first ball joint facing away from the second ball joint.

18. The manipulator of claim 16, wherein in a case where the buffer assembly is in an initial state, at least one of the following is satisfied: the first mounting seat faces and abuts against the second mounting seat; or the first ball joint faces and abuts against the second ball joint.

19. The manipulator of claim 16, wherein the elastic member is sleeved on the guide rod, the elastic member is located on a side of the second ball joint facing away from the first ball joint, an end of the elastic member is fixed relative to the guide rod, another end of the elastic member abuts against the second ball joint, and the elastic member is always in a compressed state.

20. The manipulator of claim 19, wherein in a case where the buffer assembly is in an initial state, a surface of the second mounting seat abuts against a surface of the first mounting seat.

* * * * *